United States Patent
Rakhmailov

(10) Patent No.: US 6,442,945 B1
(45) Date of Patent: Sep. 3, 2002

(54) GAS TURBINE ENGINE

(75) Inventor: Anatoly Rakhmailov, Bataysk (RU)

(73) Assignee: ALM Development, Inc., Washington, DC (US)

( * ) Notice: Subject to any disclaimer, the term of this patent is extended or adjusted under 35 U.S.C. 154(b) by 0 days.

(21) Appl. No.: 09/632,911

(22) Filed: Aug. 4, 2000

(51) Int. Cl.$^7$ ............................................. F02C 7/00
(52) U.S. Cl. ...................... 60/791; 60/39.41; 60/39.511
(58) Field of Search ........................... 60/39.03, 39.161, 60/39.41, 39.511, 269, 726, 39.791

(56) References Cited

U.S. PATENT DOCUMENTS

| | | | |
|---|---|---|---|
| 1,388,707 A | | 8/1921 | Heinze |
| 1,732,234 A | | 10/1929 | Jensky |
| 1,868,143 A | | 7/1932 | Heinz |
| 2,095,991 A | * | 10/1937 | Lysholm ................ 60/39.03 |
| 2,303,381 A | | 12/1942 | New |
| 2,322,987 A | * | 6/1943 | West ..................... 60/39.27 |
| 2,410,259 A | | 10/1946 | Birmann |
| 2,535,488 A | * | 12/1950 | Dros ...................... 60/39.15 |
| 2,579,049 A | | 12/1951 | Price |
| 2,715,011 A | | 8/1955 | Schorner |
| 2,784,551 A | | 3/1957 | Karlby et al. |
| 2,821,067 A | | 1/1958 | Hill |
| 2,823,520 A | | 2/1958 | Spalding |
| 3,034,298 A | | 5/1962 | White |
| 3,209,536 A | | 10/1965 | Howes et al. |
| 3,255,586 A | * | 6/1966 | Hennig .................. 60/39.03 |

(List continued on next page.)

FOREIGN PATENT DOCUMENTS

| | | |
|---|---|---|
| DE | 2332698 | 1/1974 |
| DE | 2335594 | 8/1974 |
| DE | 2437990 | 2/1976 |
| DE | 3713923 | 11/1987 |
| DE | 3835932 | 4/1990 |
| DE | 2018641 | 10/1991 |
| DE | 4331779 | 3/1995 |
| EP | 0103370 | 3/1984 |
| FR | 1163559 | 9/1958 |
| FR | 1166419 | 11/1958 |
| FR | 2385899 | 10/1998 |
| GB | 196452 | 4/1923 |
| GB | 412970 | 7/1934 |
| GB | 413697 | 7/1934 |
| GB | 720436 | 12/1954 |
| GB | 753652 | 7/1956 |
| GB | 801281 | 9/1958 |
| GB | 803994 | 11/1958 |
| GB | 1435687 | 5/1976 |
| JP | 11159345 | 6/1999 |
| RU | 1774290 | 6/1992 |
| RU | 2050455 | 12/1995 |
| RU | 2052145 | 1/1996 |
| WO | WO9505063 | 2/1995 |

*Primary Examiner*—Louis J. Casaregola
(74) *Attorney, Agent, or Firm*—Hughes Hubbard & Reed LLP; Ronald Abramson; Peter A. Sullivan

(57) ABSTRACT

A gas turbine engine has a compressor, a combustor mounted downstream of the compressor, power turbine mounted downstream of the combustor, a counter-rotating compressor turbine having a temperature sensor at its outlet, a temperature control system for controlling the temperature at the outlet of the compressor turbine, and a fuel supply control system for supplying fuel to the combustor. The engine has a drive motor for causing the compressor to rotate and a motor control system having a motor power-up module with an input connected to the fuel supply control system, and a motor power output control module having a first input connected to the motor power-up module, a second input connected to the temperature sensor, and an output which is connected to the drive motor.

4 Claims, 3 Drawing Sheets

U.S. PATENT DOCUMENTS

| | | |
|---|---|---|
| 3,280,555 A | 10/1966 | Charpentier et al. |
| 3,287,904 A | 11/1966 | Warren et al. |
| 3,469,396 A | 9/1969 | Onishi et al. |
| 3,625,003 A | 12/1971 | Liddle et al. |
| 3,703,808 A | 11/1972 | Stearns |
| 3,727,401 A | 4/1973 | Fincher |
| 3,751,911 A | 8/1973 | Tartaglia |
| 3,775,974 A | 12/1973 | Silver |
| 3,826,084 A | 7/1974 | Branstrom et al. |
| 3,883,263 A | 5/1975 | Mai |
| 3,886,732 A | 6/1975 | Gamell |
| 3,971,209 A | 7/1976 | de Chair |
| 4,003,199 A | 1/1977 | Bell, III et al. |
| 4,022,544 A | 5/1977 | Garkusa |
| 4,024,705 A | 5/1977 | Hedrick |
| 4,084,922 A | 4/1978 | Glenn |
| 4,142,836 A | 3/1979 | Glenn |
| 4,183,420 A | 1/1980 | Kinoshita |
| 4,193,568 A | 3/1980 | Heuvel |
| 4,213,297 A | 7/1980 | Foster et al. |
| 4,277,938 A | 7/1981 | Belke et al. |
| 4,311,431 A | 1/1982 | Barbeau |
| 4,338,780 A | 7/1982 | Sakamoto et al. |
| 4,338,781 A | 7/1982 | Belke et al. |
| 4,350,008 A | 9/1982 | Zickwolf, Jr. |
| 4,370,094 A | 1/1983 | Ambrosch et al. |
| 4,470,261 A | 9/1984 | Kronogard et al. |
| 4,501,053 A | 2/1985 | Craig et al. |
| 4,522,557 A | 6/1985 | Bouiller et al. |
| 4,549,402 A | 10/1985 | Saintsbury et al. |
| 4,791,784 A | 12/1988 | Minardi et al. |
| 4,817,858 A | 4/1989 | Verpoort |
| 4,991,391 A | 2/1991 | Kosinski |
| 5,054,279 A | 10/1991 | Hines |
| 5,123,242 A | 6/1992 | Miller |
| 5,148,670 A * | 9/1992 | Birch et al. ............... 60/39.41 |
| 5,201,796 A | 4/1993 | Glinski et al. |
| 5,212,943 A | 5/1993 | Harris |
| 5,232,335 A | 8/1993 | Narayana et al. |
| 5,269,133 A | 12/1993 | Wallace |
| 5,473,881 A | 12/1995 | Kramnik et al. |
| 5,628,182 A | 5/1997 | Mowill |
| 5,762,156 A | 6/1998 | Bates et al. |
| 6,032,466 A | 3/2000 | Woollenweber et al. |
| 6,134,876 A * | 10/2000 | Hines et al. ............... 60/39.41 |

* cited by examiner

GAS TURBINE ENGINE

This application cross-references nine co-pending U.S. patent applications, Ser. Nos. 09/161,104, 09/161,114, 09/161,115 and 09/161,170, all of which were filed on Sep. 25, 1998, and Ser. Nos. 09/267,893, 09/267,894, 09/267,895, 09/267,896 and 09/267,897 all of which were filed on Mar. 11, 1999, and also five co-pending U.S. provisional patent applications, Serial Nos. 60/158,935, 60/158,929, 60/159,065, 60/159,066 and 60/158,934, all of which were filed on Oct. 12, 1999. Each of the above is incorporated by reference herein.

The invention relates to the field of gas turbine engines, and more specifically, to gas turbines having a no-load operation control system.

BACKGROUND OF THE INVENTION

This invention concerns gas turbine engines of a type that can be especially useful for driving electric generators or vehicles and in other applications where it is preferred to have a moderate power output, small size and high response speed. A gas turbine engine of this type has a compressor, a combustor mounted downstream of the compressor and a power turbine mounted downstream of the combustor.

A compressor turbine, rotating in a direction opposite to the direction of rotation of the power turbine, is mounted downstream of the power turbine for driving the compressor. The engine has a temperature control system for controlling the temperature at the outlet of said compressor turbine, as referred to in a pending application Ser. No. 09/267,893. The compressor in this gas turbine engine rotates independently of the power turbine and compresses gas from the compressor turbine exhaust to feed this gas back to the combustor and through a heat exchanger for power turbine cooling, as described in detail in our earlier patent application Ser. No. 09/161,115.

When the gas turbine engine idles, the compressor must continue to rotate and sustain recirculation of the exhaust gas in the flow duct of the engine because otherwise combustion in the combustor cannot be sustained, and the engine will not be able to sustain the load when the load is again applied. In order to rotate the compressor in the no-load mode (when the power turbine does not rotate and the compression ratio in the compressor substantially decreases), the efficiency is very low, and too much fuel is consumed without doing any useful work. In addition, burning too much fuel without generating power is associated with useless harmful emissions (both thermal and chemical). This gas turbine engine, while having a very good efficiency over the major part of the power range, is rather inefficient when it idles, similarly to the majority of the state-of-the art thermal engines.

This disadvantage is eliminated in the gas turbine engine according to the invention as described below.

SUMMARY OF THE INVENTION

It is an object of the invention to provide a gas turbine engine in which the fuel consumption is minimized or eliminated when the engine idles.

Another object of the invention is to improve the overall fuel economy of the gas turbine engine of the above-described type.

A further object of the invention is to reduce harmful emissions of the gas turbine engine when the engine idles.

The foregoing objects are accomplished by a gas turbine engine having a compressor, a combustor mounted downstream of the compressor, and a power turbine mounted downstream of the combustor. This engine has a compressor turbine that is mounted downstream of the power turbine for producing power to drive the compressor and that rotates in a direction opposite to the direction of rotation of the power turbine. The gas turbine engine has a temperature control system for keeping a preset temperature at the compressor turbine outlet, a fuel supply control system, a drive motor to drive the compressor rotation, a motor control system having a motor power-up module with an input connected to the fuel supply control system and a motor power output control module with a first input connected to the motor power-up module and an output which is connected to the drive motor, and a temperature sensor positioned at the outlet of the compressor turbine and connected to a second input of the motor power output control module.

Other objects and advantages of the invention will become apparent from the following detailed description of preferred embodiments thereof and the accompanying drawings.

DESCRIPTION OF PREFERRED EMBODIMENTS

Figure 1A:
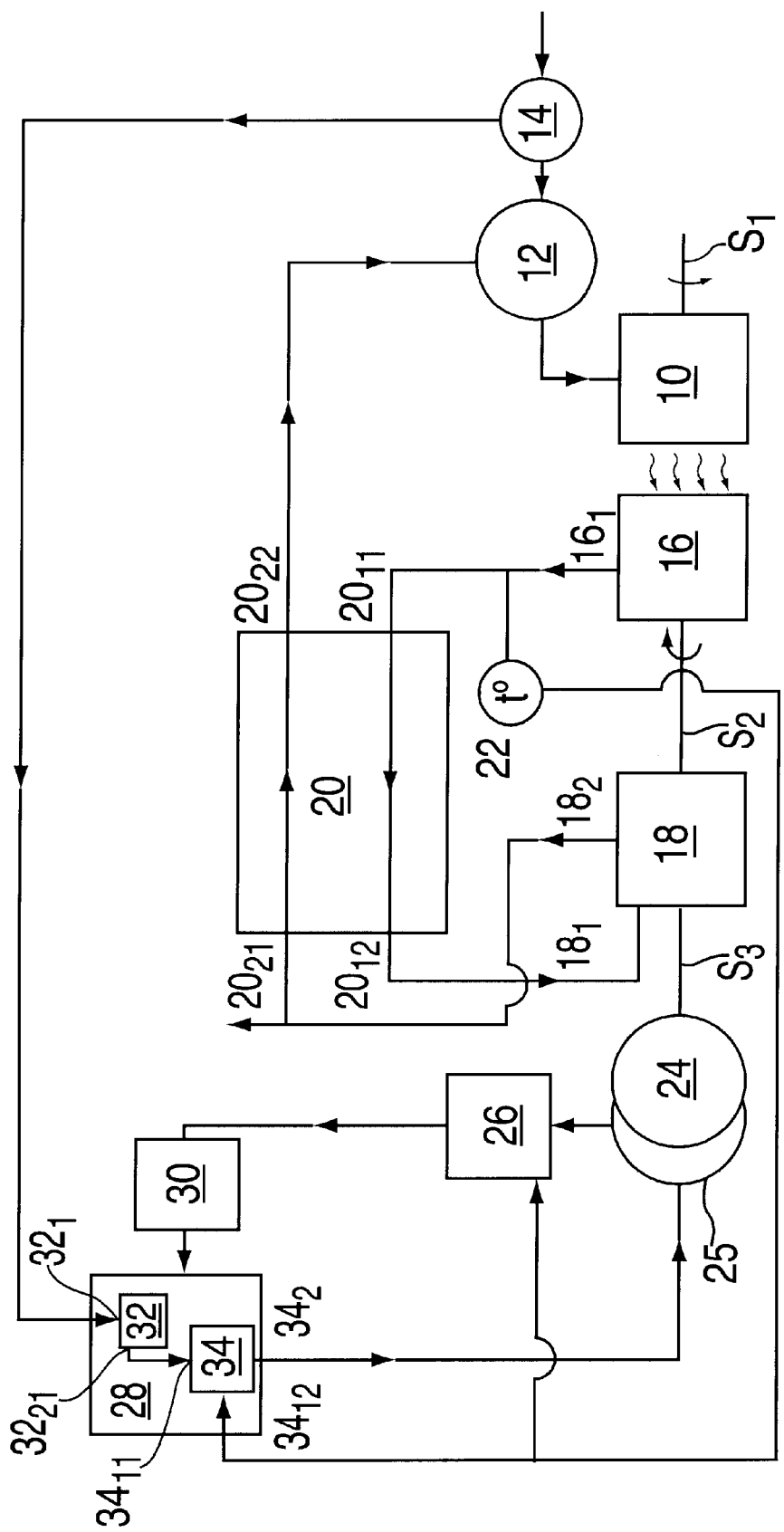
FIG. 1a shows a schematic diagram of one embodiment of a gas turbine engine according to the invention.

In FIG. 1a, in which a gas turbine engine according to the invention is shown schematically, a power turbine 10, which is designed to produce output power though shaft S1, is mounted downstream of a combustor 12 that is connected to a fuel supply control system 14, which delivers fuel for burning in the combustor with combustion air supplied to combustor 12 (not shown). A compressor turbine 16 is mounted downstream of power turbine 10 for rotation in a direction opposite to the direction of rotation of the power turbine. Compressor turbine 16 receives the gas from power turbine 10 and has an outlet $16_1$ for its exhaust gas. A compressor 18, which is mounted via a shaft S2 to compressor turbine 16 receives the power produced by compressor turbine 16 to use for compressor rotation. Compressor 18 compresses the exhaust gas that comes from outlet $16_1$ of compressor turbine 16. This exhaust gas goes from outlet $16_1$ of compressor turbine 16 to an inlet $20_{11}$, a first circuit of a heat exchanger 20 and is admitted to inlet $18_1$ of compressor 18 from an outlet $20_{12}$ of the first circuit of heat exchanger 20. The compressed gas from an outlet $18_2$ of compressor 18 is supplied to an inlet $20_{21}$ of a second circuit of heat exchanger 20 and is fed from an outlet $20_{22}$ of heat exchanger 20 to combustor 12. A part of the gas from outlet $20_{22}$ of the second circuit of heat exchanger 20 may be diverted (not shown) to power turbine 16 for cooling purposes, as described in detail in pending application Ser. No. 09/161,115.

The above-described gas turbine engine cycle requires temperature control at outlet $16_1$ of compressor turbine 16 to keep the temperature at outlet $16_1$ constant over the entire power range. A device for keeping the temperature at the outlet of the compressor turbine on the gas turbine engine of this type is described in detail in pending patent application Ser. No. 09/161,170. When the gas turbine engine is operated under load, power turbine 10 rotates to produce useful energy on shaft S1, and the power on shaft S2 of compressor turbine 16 which goes to compressor 18 is controlled by controlling the load on an electrical generator (to be described later) which removes an excess of energy from shaft S2 to keep constant the temperature at outlet $16_1$ of compressor turbine 16. The temperature at the outlet of compressor turbine 16 is sensed by a temperature sensor 22, which can be a thermocouple installed in the compressor turbine exhaust duct.

This method of gas turbine engine operation is useful over the entire power range, with the exception of the no-load mode. During operation under load, fuel supply control system 14 meters to combustor 12 the quantity of fuel which is required to make up for the power demand on shaft S1 of power turbine 10. Compressor turbine 16 rotates compressor 18 to maintain the necessary recirculation of the exhaust gas in the flow duct of the gas turbine engine, and the above-mentioned temperature control system uses the signals from temperature sensor 22 to control the discharge capacity of the compressor so as to adjust the compressor operation to the cooling needs of power turbine 10.

Operation of the gas turbine engine according to the invention when the engine idles will be described with reference to FIG. 2, in which the following curves are shown:

η is the efficiency of the gas turbine engine.
$Q_f$ is the fuel flow (fuel consumption).
$T_{22}$ is the temperature at outlet $16_1$ of compressor turbine 16.
$P_d$ is the motor drive power.
$P_d+P_h$ is the total power of the drive motor and heater.

When the gas turbine engine runs under load, e.g., in the power range from about 5% to about 15% the full load, the efficiency η increases (see FIG. 2) and then remains stable over the remainder of the power range. The fuel consumption ($Q_f$) in the power range up to about 5% remains almost stable at a certain minimum level and then increases to a maximum. In addition, the temperature at the outlet of compressor turbine 16 remains stable ($T_{22}$).

When the gas turbine engine idles (i.e., when the load is removed from shaft S1 of power turbine 10), fuel supply control system 14 lowers substantially the quantity of fuel fed to combustor 12.

In the prior art gas turbine engine, the minimum quantity of fuel fed to combustor 12 should be at a level which assures operation of compressor 18 to sustain recirculation of the exhaust gas in the engine flow duct and to sustain combustion in the combustor. This is necessary to keep the engine in the hot standby mode, and would require the fuel consumption shown by a curve portion $Q_{F1}$ in FIG. 2.

The amount of fuel consumed will be comparable at no-load with the fuel consumption in the 5% to about 15% power range. This is explained by low engine efficiency during no load conditions as can be seen in FIG. 2. When the load is removed from the gas turbine engine, fuel supply control system 14 reduces the quantity of fuel supplied for burning in combustor 12 to a quantity $Q_{F2}$ which is necessary to maintain a preset temperature $T_{22}$ at outlet $16_1$ of compressor turbine 16. This amount of fuel is sufficient to sustain combustion, but, as shown in FIG. 2, the temperature at outlet $16_1$ will increase to the level $T'_{22}$. This will take place because the quantity of fuel that fuel supply control system 14 delivers to combustor 12 is not sufficient to keep compressor 18 running. This condition would result in the undesired overheating.

In order to prevent this overheating from occurring, compressor 18 is caused to rotate by means of a drive motor 24 which is mechanically coupled to compressor 18, e.g., by means of a shaft S3. The drive motor may be powered by any kind of energy, but for the purposes of this specific embodiment it is assumed that drive motor 24 is powered by electric energy. It will be apparent that drive motor 24 has to assure rotation of the compressor in such a manner as to maintain the temperature at outlet $16_1$ of compressor 16 at the level $T_{22}$ (FIG. 2).

The gas turbine engine has a temperature control system for keeping the temperature at the level $T_{22}$ during operation under load. This temperature control system has a generator 25 mechanically coupled to compressor 18, which is connected to an electric load unit 26 controlled by signals from temperature pickup 22. This system prevents compressor 18 from overcooling the engine system when the compressor turbine has excessive power at certain modes in the major part of the power range. The details of this temperature control system are described in our pending application Ser. No. 09/161,170. A drive motor control system 28 connected to a power supply 30 keeps the temperature at level $T_{22}$. Power supply 30 may be a storage battery, which itself may be connected to electric load unit 26 for charging. Motor control system 28 has a motor power-up module 32 with an input $32_1$ connected to fuel supply control system 14 for receiving a signal of a decrease in the fuel supply to a quantity corresponding to the no-load mode of the engine ($Q_{F2}$ in FIG. 2). This signal, in the simplest case, can be obtained from a throttle lever movement (not shown) or from an output of a fuel control module (not shown).

An output $32_{21}$ of power-up module 32 is connected to a first input $34_{11}$ of a motor power output control module 34 for sending a signal to this module, indicating that drive motor 24 has to be turned ON. When this signal is received at first input $34_{11}$ of motor output power control module 34, this module assures the energizing of drive motor 24 by storage battery 30. Drive motor 24 will thus cause compressor 18 to rotate where it would otherwise remain stationary because of inadequate fuel supply to combustor 12. A second input $34_{12}$ of motor power output control module 34 is connected to temperature sensor 22 to receive a temperature signal in order to control the output voltage at an output $34_2$ of motor power output control module 34. When the temperature at output $16_1$ of compressor turbine 16 increases (as shown in FIG. 2 by a dotted line between the $T_{22}$ and $T'_{22}$ temperature levels), the voltage at output $34_2$ of motor power output control module 34 will increase, and power output of the motor 24 will increase to raise the speed (and the discharge capacity) of compressor 18 and to lower the temperature to the level $T_{22}$.

Figure 2:
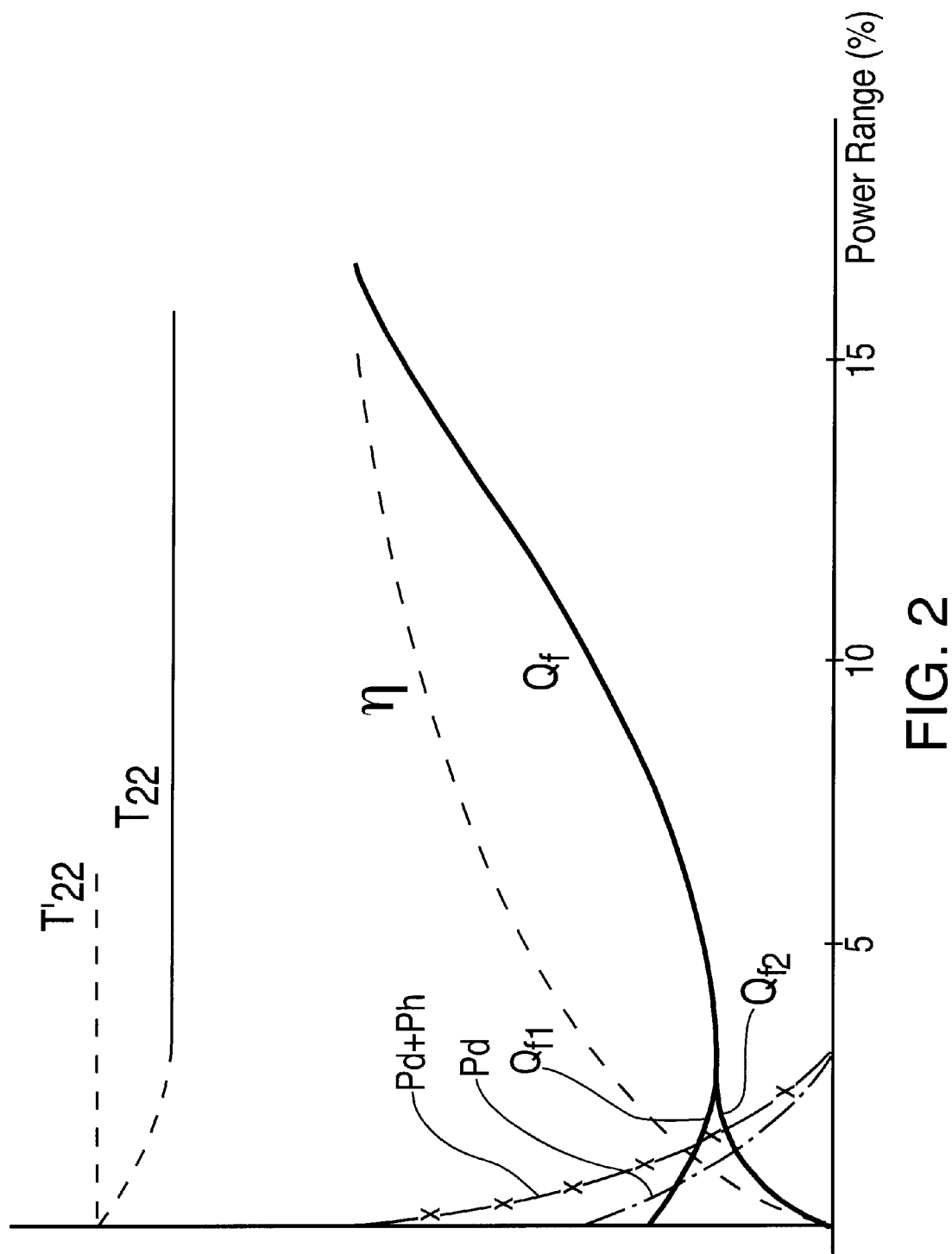
FIG. 2 is a combined plot illustrating conceptually gas turbine engine operation according to the invention when the engine idles.

The power consumed by drive motor 24 is shown by curve $P_d$ in FIG. 2. It can be seen that the maximum power of storage battery 30 is drawn when the temperature is increased to the maximum level $T'_{22}$. When the temperature decreases to the level $T_{22}$, no power is drawn from storage battery 30. As a result, the gas turbine engine runs, consuming a minimum amount of fuel ($Q_{f2}$) necessary for maintaining combustion and the temperature level $T_{22}$ at the outlet of compressor turbine 16.

Drive motor 24 runs on storage battery 30. During gas turbine engine operation under load, storage battery 30 is charged by generator 25. Generator 25 absorbs the excessive power output of the compressor turbine to protect the engine from being overcooled. This energy absorption is useful for the engine, so the energy stored in storage battery 30 is acquired relatively inexpensively. As this stored energy is spent for reducing the fuel consumption when the engine is idling, the rotation of the drive motor is assured by using the internal resources of the gas turbine engine. This means that the overall efficiency of the gas turbine engine is improved if the average fuel economy is evaluated for a certain period of engine operation. The lower fuel consumption at no-load also reduces emissions (both thermal and chemical) when the engine is idling.

Although drive motor 24 for the no-load operation of the gas turbine engine and generator 25 for temperature control are shown as independent units in the described embodiment, a single motor/generator unit can be installed which will perform both functions: generation of electric power for loading compressor turbine 16 when the compressor output is too high and generation of mechanical power to positively rotate compressor 18 at no-load when the temperature at the output of compressor turbine 16 has to be kept at a preset level ($T_{22}$). The manner in which such motor/generator works and is connected and controlled is well known to those skilled in the art, it does not have a material bearing on this invention, and, therefore, is not disclosed here.

When the gas turbine engine described here idles, it takes a certain time for fuel supply control system 14 and drive motor control system 28 to respond and to energize drive motor 24. During this time interval, the temperature within the engine remains stable because there is a certain amount of heat stored in the heat exchanger and in the gas turbine engine flow duct. This is an advantage of the semi-closed cycle. This is especially true of the gas turbine engine having a wrap-around heat exchanger which conserves heat inside the engine by acting as an insulating jacket.

Figure 1B:
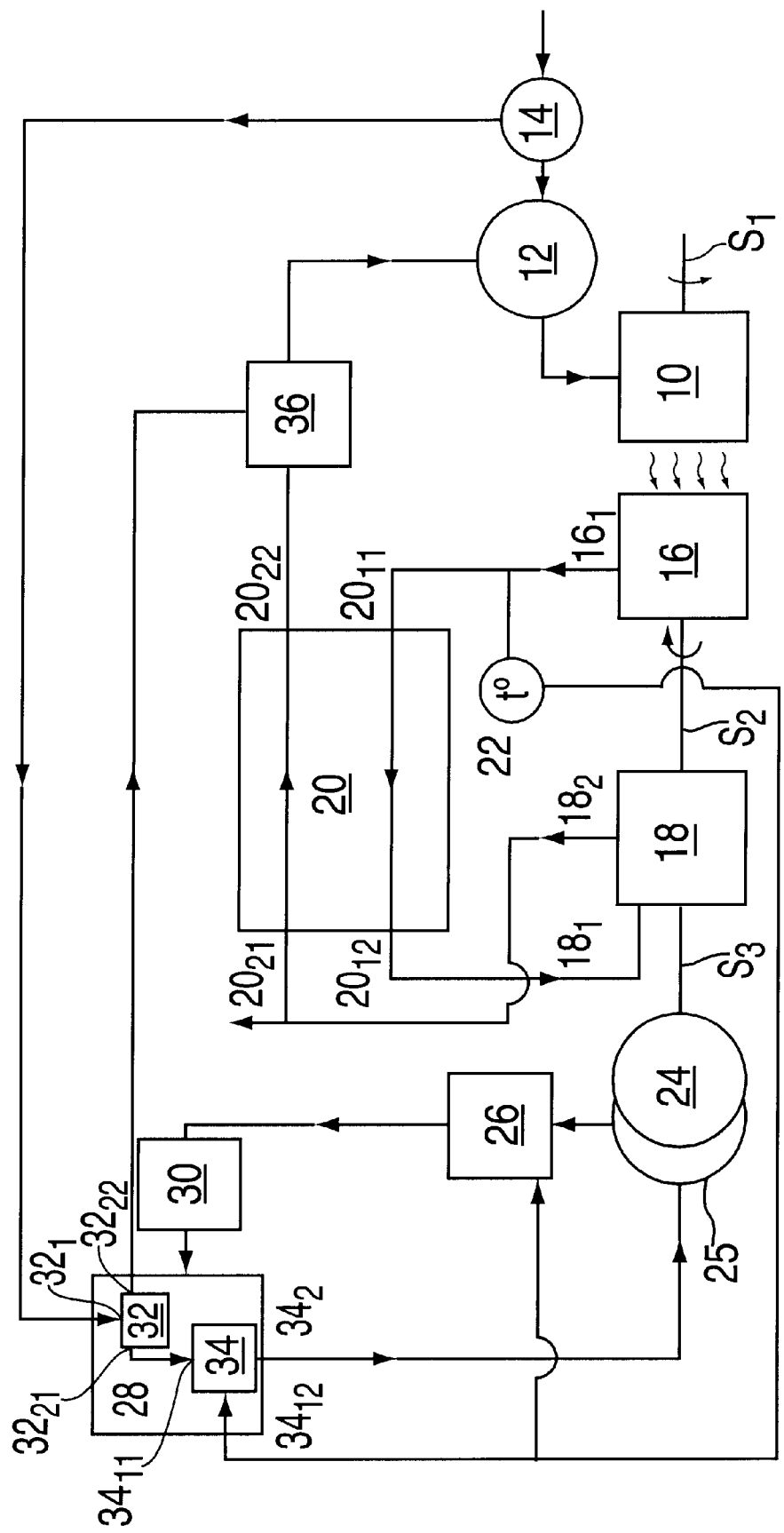
FIG. 1b shows a schematic diagram of an alternate embodiment of a gas turbine engine according to the invention.

In another embodiment which is illustrated in FIG. 1$b$, the fuel supply to combustor 12 can be reduced even further or completely shut down when the engine idles. In order to accomplish this, the gas turbine engine is provided with a device for supplying heat to combustor 12 in such a manner as to maintain the temperature at outlet $16_1$ of compressor turbine 16 at a preset level ($T_{22}$). This can be done in various ways. It is preferred to supply heat to the combustor by heating the gas in the flow duct of the gas turbine engine downstream of the heat exchanger, e.g., after outlet $20_{22}$ of the second circuit of heat exchanger 20. This is achieved using a heater 36 installed in the line between outlet $20_{22}$ of the second circuit of heat exchanger 20 and combustor 12. Heater 36 can be made, for example, in the form of an electric heating element incorporated in the flow duct. Heater 36 can be connected to drive motor control system 28 through a second output $32_{22}$ of power-up module 32 and powered up by this system when motor power-up module 32 receives the signal from fuel supply control system 14 when the gas turbine engine goes idling. Heater 36 uses the power from the same storage battery 30 or from another power supply source connected to motor control system 28 (not shown). It is understood that compressor 18 will also be rotated by drive motor 24 as described above in order to control the temperature at outlet $16_1$ of compressor turbine 16. The power drawn from storage battery 30 in this case will be as shown by curve $P_d+P_h$ in FIG. 2. Similarly to the first embodiment, the maximum power is drawn from the storage battery 30 when the temperature at the outlet of compressor turbine 16 reaches the maximum level $T'_{22}$. When the temperature decreases to the level $T_{22}$, drive motor 24 is stopped, and no power is drawn from storage battery 30. A single storage battery 30 may not have the necessary capacity for supplying power for both heater 36 and drive motor 24. In such case, an additional storage battery can be used.

Various modifications and changes can be made. Thus a hydraulic or pneumatic motor can be used instead of electric motor 24, and storage battery 30 in this case can be replaced by a hydraulic or pneumatic pressure accumulator. Drive motor control system 28 may be made as a controller based on a microprocessor which can perform the control functions described above. Heater 36 can be installed in the combustor or in any other place of the gas turbine engine and can be based on a different heating concept (induction heating, etc.).

I claim:

1. A gas turbine engine comprising:

a compressor;

a combustor mounted downstream of said compressor and a power turbine mounted downstream of said combustor;

a compressor turbine having an outlet and mounted downstream of said power turbine for producing power for driving said compressor, said compressor turbine being mechanically coupled to said compressor to transmit said power to said compressor and said compressor turbine rotating in a direction opposite to the direction of rotation of said turbine power turbine;

a temperature control system for controlling the temperature at said outlet of said compressor turbine;

a fuel supply control system for supplying fuel for burning said fuel in said combustor;

a drive motor coupled to said compressor to adjust compressor rotation during low fuel operation;

a motor control system having a motor power-up module, said motor power-up module having an input connected to said fuel supply control system and an output, said motor control system also having a motor power output control module, said motor power output control module having a first input connected to said motor power-up module, a second input and an output which is connected to said drive motor; and a temperature sensor positioned at said outlet of said compressor turbine and connected to said second input of said motor power output control module.

2. The gas turbine engine of claim 1, wherein said gas turbine engine further comprises a heater for supplying heat to said combustor, and means for controlling said heater.

3. The gas turbine engine of claim 2, wherein said means for controlling said heater is said motor power-up module having a second output which is connected to said heater.

4. The gas turbine engine of claim 1, wherein said gas turbine engine further comprises a heater to supply heat to said combustor, and a motor power-up module connected to said heater control said heater.

* * * * *